United States Patent
Harless

(10) Patent No.: US 9,127,986 B2
(45) Date of Patent: Sep. 8, 2015

(54) METHOD AND APPARATUS FOR REMOTELY MONITORING ACROLEIN TEMPERATURE IN STORAGE TANKS

(75) Inventor: Michael L. Harless, Humble, TX (US)

(73) Assignee: Multi-Chem Group, LLC, San Angelo, TX (US)

(*) Notice: Subject to any disclaimer, the term of this patent is extended or adjusted under 35 U.S.C. 154(b) by 384 days.

(21) Appl. No.: 13/579,502

(22) PCT Filed: Feb. 16, 2010

(86) PCT No.: PCT/US2010/024253
§ 371 (c)(1),
(2), (4) Date: Oct. 25, 2012

(87) PCT Pub. No.: WO2011/102828
PCT Pub. Date: Aug. 25, 2011

(65) Prior Publication Data
US 2013/0038471 A1  Feb. 14, 2013

(51) Int. Cl.
G08C 19/12 (2006.01)
G08B 21/00 (2006.01)
G08B 23/00 (2006.01)
G08B 17/00 (2006.01)
C08F 2/00 (2006.01)
G01M 17/00 (2006.01)
G01K 1/02 (2006.01)

(52) U.S. Cl.
CPC ............................ G01K 1/024 (2013.01)

(58) Field of Classification Search
CPC ................................................ G08B 19/00
See application file for complete search history.

(56) References Cited

U.S. PATENT DOCUMENTS

| 5,936,531 A * | 8/1999 | Powers .......................... 340/628 |
| 6,518,374 B1 * | 2/2003 | Aichinger et al. ............... 526/84 |
| 6,989,410 B2 * | 1/2006 | Hamilton et al. ............... 523/340 |
| 2004/0178526 A1 * | 9/2004 | Kojima et al. ................ 264/1.32 |
| 2004/0241291 A1 * | 12/2004 | Liu et al. ........................ 426/116 |
| 2008/0007431 A1 * | 1/2008 | Jacques ......................... 340/984 |
| 2008/0269521 A1 * | 10/2008 | Hammon et al. .............. 562/532 |

OTHER PUBLICATIONS

International Search Report for International Application No. PCT/US10/24253, mailed on Apr. 21, 2010 (2 pages).

* cited by examiner

*Primary Examiner* — Jennifer Mehmood
*Assistant Examiner* — Pameshanand Mahase
(74) *Attorney, Agent, or Firm* — Holly Soehnge; Baker Botts L.L.P.

(57) ABSTRACT

An apparatus and method for remotely monitoring the temperature of acrolein in a storage tank has a temperature sensor in communication with the acrolein in the tank and with a temperature transmitter. A global positioning receiver/transmitter communicates with the temperature transmitter and sends the temperature data to a remote base station via a linking satellite while also providing location data about the storage tank. At the base station, the temperature data related to the actual temperature of the acrolein in the tank is compared to predetermined temperature set points. These predetermined set points correlate to polymerization reaction of the acrolein. When the set points are reached, a response processor initiates a response to control the polymerization reaction of the acrolein in the storage tank.

11 Claims, 1 Drawing Sheet

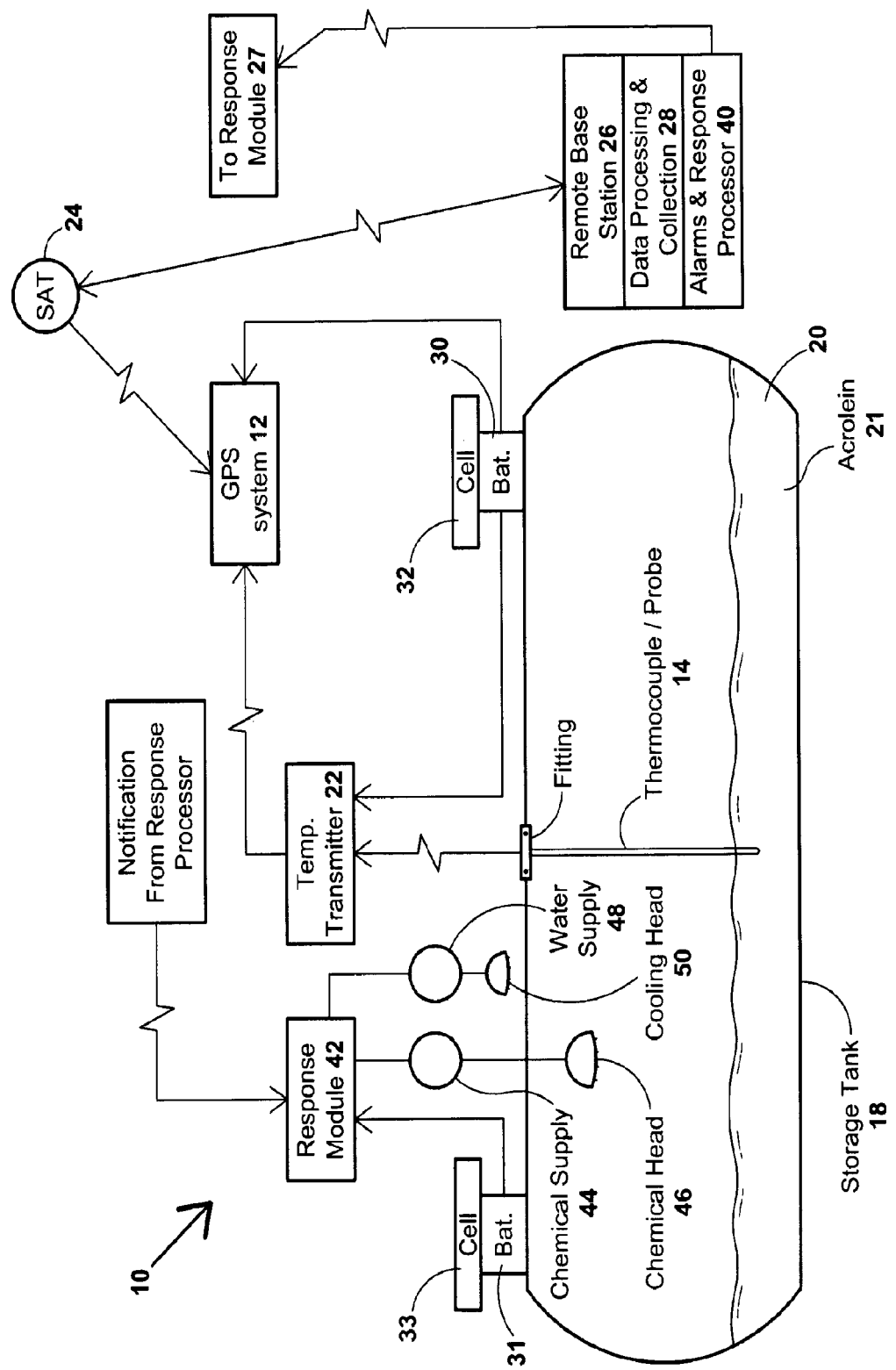

METHOD AND APPARATUS FOR REMOTELY MONITORING ACROLEIN TEMPERATURE IN STORAGE TANKS

BACKGROUND OF THE INVENTION

The present invention relates to a method and apparatus for remotely sensing, monitoring, and recording the temperature of acrolein in a storage tank. More specifically, the present invention uses a commercially available global positioning system (GPS) receiver/transmitter to communicate the temperature of acrolein in the storage to a remote base station via a satellite in order to alert users of a dangerous condition within the storage tank and initiate appropriate responsive action. Solar powered, rechargeable batteries supply power to the temperature sensor/transmitter, the GPS transmitter/receiver, and the response mechanism at the storage tank.

The efficient reduction and removal hydrogen sulfide ($H_2S$) from produced fluids in oil and gas operations has considerable environmental impact. One of the ways of minimizing $H_2S$ is the addition of chemical scavengers directly to production containing oil, water, and gas. Acrolein (2-propenal) has been shown to be an effective chemical scavenger in oil and gas production. Thus, acrolein is often stored at oil/gas production sites for use in treating the produced fluids. Many times such sites are in remote locations which makes monitoring of the acrolein storage tanks difficult. It will be understood that acrolein storage tanks are also used in the agriculture market (aquatic herbicide and/or nematicide) and are thus within the scope of the present invention.

Since acrolein is a highly reactive chemical, it has the potential to undergo violent exothermic polymerization. In extreme cases, the polymerization can occur with enough force to rupture the storage tank resulting in release of hazardous chemical and metal fragments from the tank. Thus, monitoring the condition of stored acrolein to detect dangerous polymerization is an important safety aspect where it is used in hydrocarbon production. Such polymerization may be detected by a change in the liquid acrolein temperature.

Polymerization may occur for a number of reasons, including contamination with incompatible chemicals, heat above 200° Fahrenheit, or exposure to light or gamma radiation. Contamination with various chemicals may initiate polymerization radically, anionically or cationically. The type of polymerization reaction that occurs depends on the specific contaminant.

Radical polymerization is typically induced by oxygen contamination and can be minimized by a polymerization inhibitor, such as hydroquinone. As acrolein product in a vessel ages, hydroquinone content can decrease resulting in an increased likelihood that polymerization will occur.

Ionic polymerization may occur if contaminants are introduced into the product container by connection of contaminated equipment or by intrusion of process fluids flowing back into the storage vessel. Contaminants that typically are associated with ionic polymerization of acrolein are alkaline compounds, such as caustic soda, ammonia, and amines, or by mineral acids, such as concentrated sulfuric acid. Hydroquinone is not effective as an inhibitor of ionic polymerization.

Radical polymerization principally proceeds across the vinyl functional group and ionic polymerization results in additions at the carbonyl group as shown below.

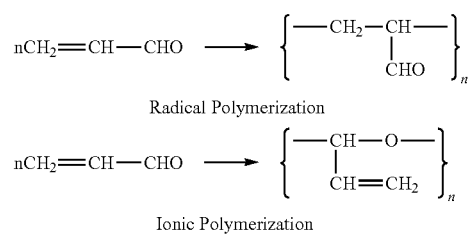

Ionic polymerization can occur very rapidly with little opportunity to mitigate any reaction if large quantities of contaminants are introduced to the acrolein container. However, if the polymerization is due to water contamination, oxygen or low concentrations of ionic contaminants, the reaction will typically proceed slowly enough to allow response measures to be implemented. The temperature increase from the polymerization reaction may result in temperatures as high as 400° Fahrenheit. However, it may take several days or hours to reach these extreme temperatures.

During the polymerization process, the temperature of the bulk liquid increases. The present inventive method and apparatus will provide notification to users that the acrolein is starting to polymerize. This notification will allow for response before a tank failure has occurred. This response may include introduction of chemicals to the tank to stop polymerization (an emergency buffer solution comprised of 84% acetic acid, 8% hydroquinone, 8% anhydrous sodium acetate), spraying cooling solution on the tank to slow the polymerization reaction, removal of the tank to a safe location or evacuation of personnel to a safe distance away from the tank.

The current method of solving the problem addressed by the present invention consists of filling the storage tank and monitoring the temperature for three days prior to shipment. If there are contaminates in the acrolein, corrective action may be taken before shipment of the storage tank. There are no controls available to allow detection of an exothermic reaction once the tank has been shipped or is in use in the field.

BRIEF DESCRIPTION OF THE DRAWINGS

FIG. 1 illustrates a schematic representation of the present invention showing an acrolein storage tank, a temperature sensor/transmitter, a global positioning transmitter/receiver, power supplies, a linking satellite, and a remote base station.

DETAILED DESCRIPTION OF THE PREFERRED EMBODIMENT

The apparatus 10 of the present invention is illustrated in FIG. 1. It includes a commercially available GPS receiver/transmitter that has the capability to process 4-20 mA data signals. An example of the type of GPS receiver/transmitter which may be used is a unit produced by Satamatics Ltd. (Model TAM210-Inmarsat D+ Transreceiver).

A temperature probe 14 (tapered thermowell with two type K thermocouples) is inserted into an acrolein storage tank 18 via a threaded fitting 16. The thermowell probe 12 is of sufficient length to extend into the liquid acrolein 20 (typically within 4 inches of the tank bottom) to ensure that any exothermic reaction is detected quickly (within 30 seconds of reaching the alarm set point temperature).

Field application tanks 18 have diameters that range from 36" to 40" and ISO tanks diameters are around 86" diameter. Thus, temperature probes 14 will usually range in length between 32" and 82". One of the thermocouples is connected to a temperature transmitter head 22. A second thermocouple (not shown) is a spare to be used in the event that the first one fails. This will require connection of the alternate thermocouple leads to the temperature transmitters when the spare is employed. The temperature transmitter head 22 will send a 4-20 ma signal to the GPS unit 12.

The temperature transmitter 22 employed is designed to transmit temperature data between 0° Celsius (32° F.) and 50° Celsius (122° F.). The mA signal is proportional to temperature (i.e. a 4 mA signal is sent for a 0° Celsius temperature and a 20 mA signal is sent for a 50° Celsius temperature).

The GPS unit 12 transmits temperature and location data two times per day to a satellite which relays the data to a base station 26. This data is processed and populates a data base 28 and the relevant information is accessible via a website.

The GPS unit 12 is further programmed to instantly transmit temperature data, regardless of the last time data was transmitted, if a pre-programmed temperature threshold is exceeded. The temperature threshold is intended to correlate to the polymerization reaction of the acrolein. This pre-programmed alarm threshold is typically 100° Fahrenheit (38° C.), but may be varied as ambient storage conditions dictate (e.g. summer temperatures in desert environments that reach 40° Celsius (104° F.) or higher may require a higher alarm threshold).

Experiments have shown that the contents of vessels exposed to ambient outdoor temperatures in the summer months of July and August in sub-tropical climates (South Texas and Louisiana) do not exceed 90° Fahrenheit (32°-33° C.). However, the 100° F. threshold may be increased in extreme temperature environments encountered in such places as the deserts of the Middle East and even decreased if used in cold climates like Alberta, Canada.

The range of alarm temperatures to be useful are approximately between 80 and 120 degrees Fahrenheit.

The GPS unit 12 and temperature transmitter 22 receive electrical power from a 12 volt sealed battery 30 that is charged by a solar panel/charge controller combination 32. The battery is typically sized to provide 90 days of power to the GPS unit and transmitter head in the event of solar panel failure.

The present inventive apparatus further utilizes a response mechanism including an alarm and response processor 40 situated in the base station 26. Once the data from the GPS unit 12 is transmitted to the base station 26 via satellite 24, the data is processed at a data processor collection unit 28.

As is well known in the art, the processed data may activate alarms and other responsive action in processor 40. In the event of a temperature excursion (temperature exceeding 100° F.), the GPS transceiver on the tank 12 will send a signal to the satellite that will relay the signal to the base station 26. This base station is programmed to send notifications via email or other communication means 27 to key response personnel at the storage tank site (part of the response module 42). These personnel may respond in a number of ways, including accessing a website that details location and temperature of the acrolein vessel in question, contacting field personnel to investigate further, instructing local response personnel in emergency procedures (polymerization mitigation procedures to employ, evacuation of nearby personnel, contacting local emergency responders, etc.) This notification system may be coupled to automated equipment via cell phone service to activate water deluge systems to slow the rate of temperature increase, activate local audible and visual alarm systems, and inject emergency buffer solutions directly into the acrolein tank.

Alternatively, an automated response mechanism may activate the response module 42 directly via cell phone signal. Using this approach, after receiving the signal from the GPS system 12 indicating that a temperature excursion had occurred, the response processor 40 would activate the response module 42 via a cell phone link. The response module 42 would then send signals to activate alarm controllers or solenoid valves to initiate water deluge or emergency buffer solution injection as further described below.

As a result of the signal from the GPS unit 12, response module 42 may activate a chemical delivery unit having a chemical supply pump 44 to introduce chemicals into the tank 18 to control, stop or slow polymerization. An example of such chemical is an emergency buffer solution having approximately 84% acetic acid, 8% hydroquinone, and 8% anhydrous sodium acetate. This pumped solution may be sprayed from chemical header 46 within the tank 18 or injected directly into the acrolein via a dip tube that extends into the tank. Dip tubes are generally an integral component of the storage tanks and are used as a means for discharging acrolein into the system being treated.

Alternatively, or in combination, as need be, response module 42 may activate a cooling solution delivery unit having a spray pump 48, whether automated or manual, to dispense cooling solution (for example, water) onto the surface of the tank 18 to reduce the external temperature and control the polymerization reaction of the acrolein 21 within the tank 18.

Alarm and response process 40 may further provide visual and audible alarms to operators at the remote base station 26 so that actions may be taken to remove the tank to a safe location or to initiate evacuation of personnel to a safe distance away from the tank 18.

It should be understood from the foregoing description that a method for remotely monitoring the temperature of acrolein in a storage tank may comprise the steps of:

providing the tank 18 with an internal temperature sensor or probe 14;

attaching the output of the probe 14 to a temperature transmitter 22 powered by a battery 30 having a solar panel/charge controller 32;

transmitting temperature data from the temperature transmitter 22 to a global positioning receiver/transmitter 12 and determining the location of the tank while in communication with a satellite 24;

receiving the transmitted temperature data and tank location data from the satellite at a remote base station 26;

processing and collecting the temperature and location data for comparing the processed temperature data to predetermined temperature set points 28; and initiating alarms and responses in a response processor 40 when the temperature data corresponds to the predetermined temperature set points and in appropriate environments.

In some alternative methods, further steps in the method include:

additionally transmitting response data from the response process 40 to a response module 42 via the satellite 24 and the global positioning receiver/transmitter 12;

providing power to the response module from a battery 31 having a solar panel/charge controller 33; and activating a response to control a polymerization reaction of the acrolein 21 in the storage tank.

In some other alternative methods, the base station is programmed to send notifications via email to key response personnel who initiate and take responsive action through automated subsystem or manually take corrective action.

While the systems and methods of this invention have been described in terms of preferred embodiments, it will be apparent to those of skill in the art that variations may be applied to the systems, methods, and in the steps or in the sequence of steps of the method described herein without departing from the concept, spirit and scope of the invention. More specifically, it will be apparent that certain materials that are both functionally and mechanically related might be substituted for the materials described herein while the same or similar results would be achieved. All such similar substitutes and modifications to those skilled in the art are deemed to be within the spirit, scope and concept of the invention as defined by the appended claims.

The invention claimed is:

1. An apparatus for remotely monitoring the temperature of acrolein in a storage tank to detect a polymerization reaction comprising:
    a temperature sensor within said tank and in communication with said acrolein;
    a temperature transmitter receiving temperature data signals from said sensor;
    a global positioning receiver/transmitter in communication with a satellite to transmit said temperature data from said temperature transmitter to a receiver/transmitter at a remote base station, said global positioning receiver/transmitter sending tank location data to said remote base;
    a power source at said storage tank to power said temperature transmitter and said global positioning receiver/transmitter, said power source including a storage battery having a solar panel/charge controller;
    a data processor and comparator for comparing said temperature data received by said remote base receiver/transmitter with a predetermined temperature set point; and
    an alarm and response processor in communication with said comparator to initiate a response to control a polymerization reaction of said acrolein in said storage tank.

2. The apparatus of claim 1 further comprises
    a response module at said storage tank receiving response data transmitted from said alarm and response processor and activating said response to control said polymerization.

3. The apparatus of claim 2, further comprising a second power source at said tank to power said response module.

4. The apparatus of claim 3, wherein said response module further comprises
    a chemical delivery unit for introducing a buffer solution into said tank upon initiation of said response to control said polymerization reaction.

5. The apparatus of claim 3, wherein said response module further comprises
    a cooling solution delivery unit for spraying cooling solution onto the surface of said storage tank upon initiation of said response to control said polymerization reaction.

6. The apparatus of claim 3, wherein said second power source includes a storage battery having a solar panel/charge controller.

7. The apparatus of claim 1, wherein said predetermined set point is in the temperature range of approximately 80° to approximately 120° F.

8. The apparatus of claim 1, wherein the alarm and response processor is a remote alarm and response processor.

9. A method of controlling acrolein polymerization in a storage tank comprising the steps of:
    providing said tank with an internal temperature sensor or probe;
    attaching the output of the probe to a temperature transmitter powered by a battery having a solar panel/charge controller;
    transmitting temperature data from said temperature transmitter to a global positioning receiver/transmitter and determining the location of said tank while in communication with a satellite;
    receiving said transmitted temperature data and tank location data from said satellite at a remote base station;
    processing and collecting said temperature and location data for comparing said processed temperature data with a predetermined temperature set point;
    initiating alarms and responses in a response processor when said temperature data corresponds to said predetermined temperature set point.

10. The method of claim 9, further comprising the steps of:
    transmitting response data from the response processor to a response module;
    providing power to said response module from a battery having a solar panel/charge controller; and
    activating a response at said storage tank to control a polymerization reaction of the acrolein in said storage tank.

11. The method of claim 9, wherein the response processor is a remote response processor.

* * * * *